United States Patent [19]

Morota et al.

[11] Patent Number: 4,764,911
[45] Date of Patent: Aug. 16, 1988

[54] OPTICAL LENS VIBRATION CONTROL FOR OPTICAL INFORMATION RECORDING AND/OR REPRODUCING APPARATUS

[75] Inventors: Makie Morota, Hino; Shoji Yoshikawa, Hachioji, both of Japan

[73] Assignee: Olympus Optical Co., Ltd., Tokyo, Japan

[21] Appl. No.: 872,788

[22] Filed: Jun. 10, 1986

[30] Foreign Application Priority Data

Jun. 12, 1985 [JP] Japan .................. 60-127575

[51] Int. Cl.$^4$ ............ G11B 7/085; G11B 21/08; G11B 21/10
[52] U.S. Cl. .................. 369/32; 369/33; 369/41; 369/44; 369/46
[58] Field of Search .......... 369/32, 33, 41, 43–46; 360/77, 78

[56] References Cited

U.S. PATENT DOCUMENTS

| | | | |
|---|---|---|---|
| 3,924,268 | 12/1975 | McIntosh et al. | 360/78 |
| 4,236,232 | 11/1980 | Jansen et al. | 369/33 |
| 4,268,745 | 5/1981 | Okano | 369/44 |
| 4,330,880 | 5/1982 | Van Dijk | 369/32 |
| 4,432,082 | 2/1984 | Hsieh et al. | 369/32 |
| 4,562,562 | 12/1985 | Moriya et al. | 369/32 |
| 4,607,358 | 8/1986 | Maeda et al. | 369/44 |
| 4,615,023 | 9/1986 | Inada et al. | 369/32 |

FOREIGN PATENT DOCUMENTS

| | | |
|---|---|---|
| 0090379 | 10/1983 | European Pat. Off. |
| 57-949940 | 6/1982 | Japan . |
| 59-154657 | 9/1984 | Japan .................. 369/33 |
| 59-193533 | 11/1984 | Japan . |

Primary Examiner—Raymond F. Cardillo, Jr.
Assistant Examiner—Steven R. Garland
Attorney, Agent, or Firm—Armstrong, Nikaido, Marmelstein & Kubovcik

[57] ABSTRACT

An optical information recording and/or reproducing apparatus is provided with a finely moving device. The movement of an optical device converging and radiating a light beam onto an optical information recording medium, is controlled to be able to finely move the position of a spot light radiated onto the recording medium. A coarsely moving device moves an optical head provided with the finely moving device and an optical system. A track crossing velocity monitoring device detects whether the track crossing velocity at which the spot light radiated onto the recording medium crosses the tracks of the recording medium is below a predetermined value. After a coarse access close to an objective track is made by the coarsely moving device, when the track crossing velocity is below the predetermined value, the clamping applied to the optical device at the time of the coarse access will be released.

10 Claims, 5 Drawing Sheets

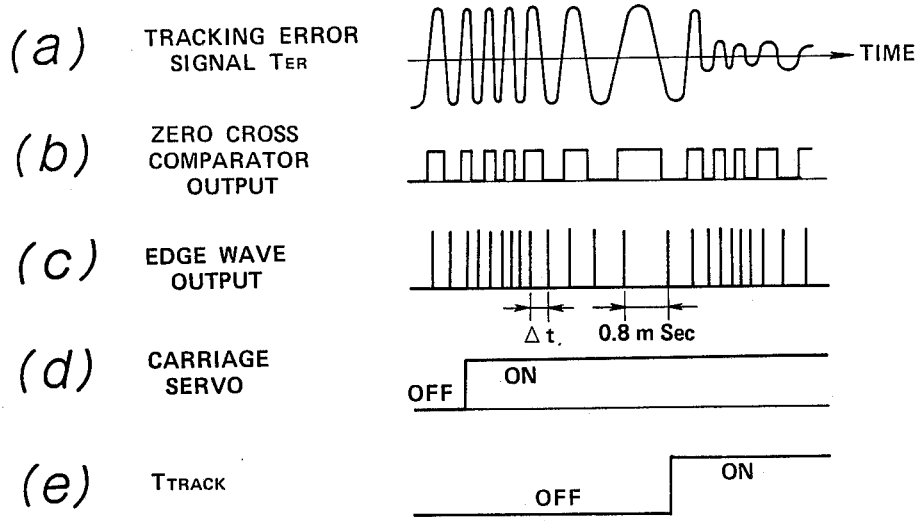
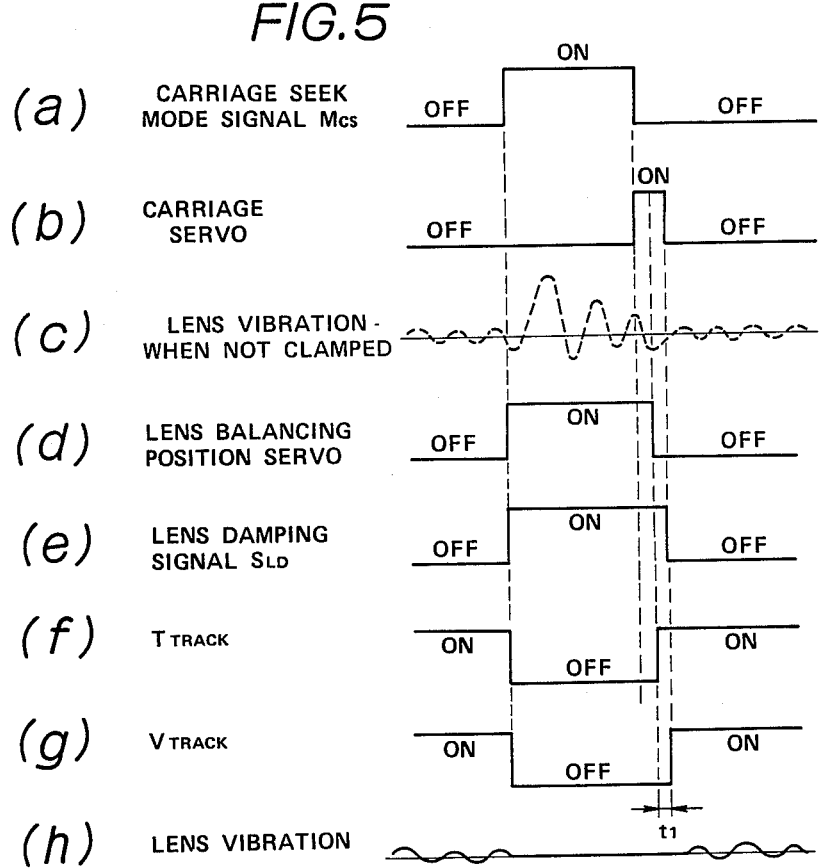

OPTICAL LENS VIBRATION CONTROL FOR OPTICAL INFORMATION RECORDING AND/OR REPRODUCING APPARATUS

BACKGROUND OF THE INVENTION

1. Field of the Invention

This invention relates to an optical information recording and/or reproducing apparatus wherein an access to an objective track can be made within a short time.

2. Related Art Statement

There is recently noted an optical information recording and/or reproducing apparatus wherein information is recorded at a high density or information recorded at a high density is quickly reproduced by converging and radiating a light beam onto an optical recording medium (disc) instead of using a magnetic head.

In the above mentioned optical apparatus, generally a track access means is provided so as to be able to record information in any objective track or to reproduce information from any objective track. Also, a focusing servo-means is provided so that the light beam radiated onto the disc may be in the form of a spot and a tracking servo-means is provided so as to hold the light beam on a predetermined track.

Now, the above mentioned track access means is made by using a coarse access (coarsely moving) means moving an optical head (pickup) containing an optical system including such optical means of converging and radiating a light beam onto a disc as, for example, an objective lens in the radial direction of the disc by means of a voice coil motor or the like and a fine access (finely moving) means moving the objective lens of the optical head by means of a lens actuator so that the coarse access means or fine access means may be operated in response to the size from the present track position. The access process wherein the optical head is moved near to the objective track by the above mentioned coarse access means within a short time and the objective lens is finely moved to be mounted on the objective track is general. However, in the case of the movement of the optical head by the coarse access means and the following stop, a force in the direction reverse to the direction of the force acting on the optical head will act on the objective lens so that the objective lens will be vibrated into the radial direction of the disc by the resilient members supporting it. If the objective lens is thus vibrated, in case the objective lens is subsequently finely moved to approach the objective track, the track will not be able to be accurately approached. Therefore, a fine access will be made only after the vibration becomes small enough. In this manner, there is a defect that the track access takes time.

In order to solve the above mentioned problem, for example, there are two related art examples as in the following.

In the first related art example disclosed in the Patent Gazette of Japanese Patent Laid Open No. 94940/1982, in making a coarse access by having an electric current flow through a voice coil motor. The current also flows through a tracking coil (lens actuator) to prevent the objective lens from vibrating in case the optical head is moved.

In the second related art example disclosed in the Patent Gazette of Japanese Patent Laid Open No. 193553/1984, a coarse access is made when the objective lens is positioned in a fixed position of the base of the optical head to prevent the objective lens from vibrating.

In either of the above mentioned first and second related art examples, no effective measures are taken or no effective means are disclosed to effectively prevent the objective lens from vibrating when the coarse access ends.

That is to say, in case the coarse access ends, the electric current flowing to the voice coil motor will become zero. However, at this time the objective lens will hold the inertia when it is moved, and will be therefore swung in the reverse direction to the direction of starting and will be vibrated. In this case, even if a part of the voltage applied to the voice coil motor at the time of the coarse access is applied also on the actuator coil and the current is made zero by a timing synchronized with the voice coil motor side when the coarse access ends, for example, the objective lens will not be able to be said to move as perfectly synchronized without any time delay with the movement of the optical head and will continue to vibrate.

When the coarse access ends, it will be necessary to read out the track position at that time point. Therefore, in case the objective lens is clamped and held until then so as to be mounted on the track, the tracking servo-means will have to be operated after releasing the clamping. However, in this case, in order to prevent the influence of the eccentricity or the like of the disc, a two-step servo-state may be set making the voice coil motor side also movable. In such a two-step servo-state, the objective lens will be vibrated particularly by the movement of the voice coil.

OBJECT AND SUMMARY OF THE INVENTION

An object of the present invention is to provide an optical information recording and/or reproducing apparatus wherein an access to an objective track can be made within a short time by effectively controlling the vibration of an optical means such as an objective lens when a coarse access ends.

According to the present invention, an optical information recording and/or reproducing apparatus is provided with a finely moving means and a coarsely moving means. The movement of an optical means, which converges and radiates a light beam onto an optical information recording medium in the direction intersecting the tracks of the recording medium, is controlled, so that the position of a spot light radiated onto the recording medium is made finely movable. An optical head provided with an optical system leading a light beam from a light source to the optical means and leading the light returning from the recording medium to a photodetector is made movable in the direction intersecting the tracks of the recording medium. A track crossing velocity monitoring means detects whether the track crossing velocity, at which the spot light radiated onto the recording medium crosses the tracks of the recording medium, is below a predetermined value or not is provided so that, after the coarse access close to the objective track by the coarsely moving means, when track crossing velocity is below the predetermined value, the optical means, clamped at the time of the coarse access, will be released.

The other features and advantages of the present invention will become apparent enough with the following explanation.

BRIEF DESCRIPTION OF THE DRAWINGS

FIGS. 1 to 7 relate to an embodiment of the present invention.

FIG. 1 is a formation view showing a control system of the embodiment.

FIG. 2 is an explanatory view showing an optical head.

FIG. 3 is a plan view showing the surroundings of position sensors for detecting the position of an objective lens.

FIGS. 4a–4e is an explanatory view for explaining the operation of a track crossing velocity monitoring means.

FIGS. 5a–5h is a timing chart showing the timing of the operation of the respective parts of the embodiment.

FIG. 6 is a formation view of a timing logic circuit of the embodiment.

FIGS. 7a–7g is an explanatory view for explaining the operation of the timing logic circuit.

DETAILED DESCRIPTION OF PREFERRED EMBODIMENTS

Figure 2:
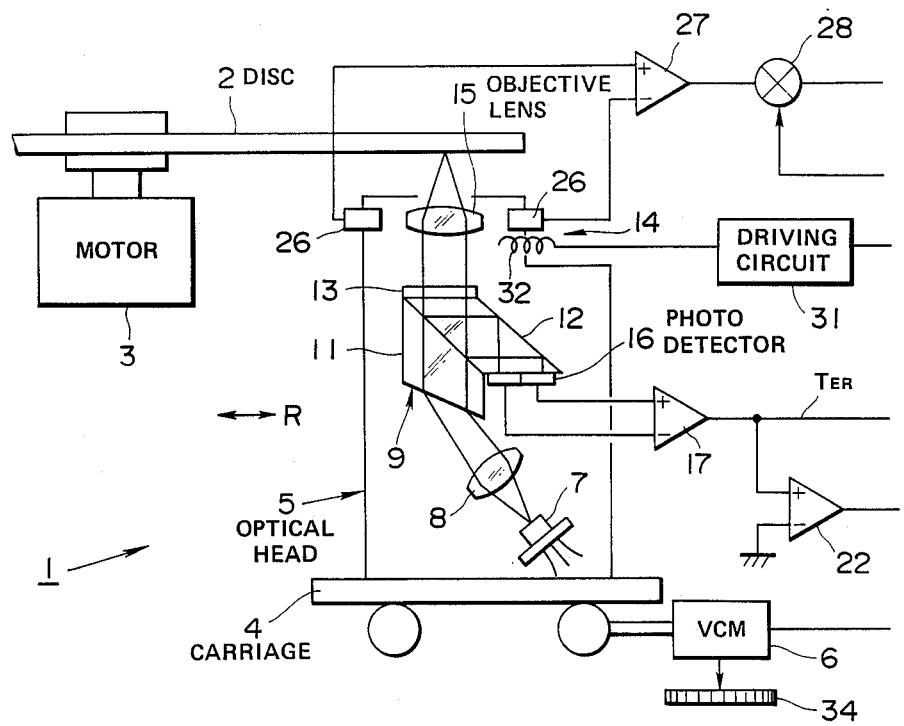

The optical information recording and/or reproducing apparatus 1 of the embodiment has such optical system as is shown in FIG. 2.

An optical recording medium (for example, a disc) 2 can be fitted to a rotary shaft of a spindle motor 3 through a rotatable clamping means so as to be rotated and driven by the motor 3.

Opposed to one recording surface of the disc 2, an optical head (optical pickup) 5 is fitted to a carriage 4 movable in the radial direction R intersecting at right angles with concentrically or spirally formed recording tracks of the disc 2. The carriage 4 can be moved in the radial direction R of the disc 2 by a voice coil motor (VCM) 6 such as during coarse searching during recording or reproducing a signal.

The optical head 5 is provided with a semiconductor laser 7 as a light source so that light such as, for example, a P-polarized light emitted from the semiconductor laser 7 is made a parallel light beam by a collimating lens 8. The light is shaped from elliptic to circular by a shaping prism 11 in an integral prism 9 having shaping, polarizing and critical angle detecting parts. The light is passed through a polarizing prism 12 and a λ/4-plate 13 and is projected as a light beam converged to be spot-shaped onto the surface of the disc 2 by an objective lens 15 as an optical means forming a lens actuator (objective lens driving device) shown in FIG. 3. The light reflected on the disc 2 surface is again passed through the objective lens 15 and λ/4-plate 13, and is incident upon the polarizing prism 12. The light is then reflected, has the critical angle detected and is incident upon a photodetector 16. The photodetector 16 is formed of a 4-part divided photodiode to detect the tracking, focusing and RF.

Figure 1:
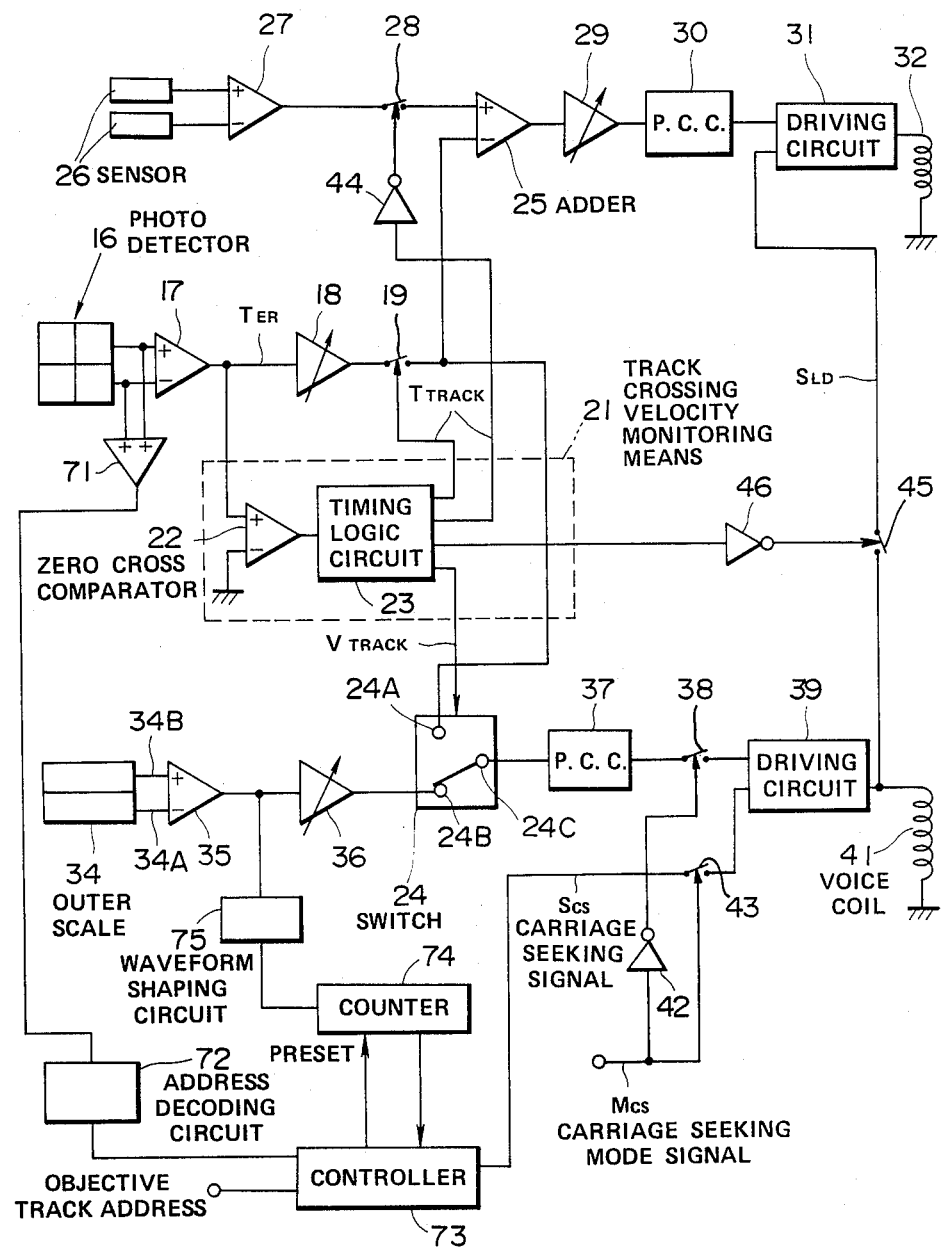

In the above mentioned tracking detection, a tracking error signal $T_{ER}$ is obtained by a difference signal output obtained by passing the photodiode outputs of the 2 parts arranged symmetrically above and below (in the direction vertical to the paper surface) through a differential amplifier 17. As shown in FIG. 1, the tracking error signal $T_{ER}$ is put into an analogue switch 19 through a gain control circuit 18 and is put into a timing logic circuit 23 through a zero cross comparator 22 forming a light beam track crossing velocity (or crossing time) monitoring means 21.

The signal having passed through the analogue switch 19 is applied to one contact 24A of a switching switch 24 in which the switching is controlled by the output of the timing logic circuit 23 and is applied to an adder 25.

Figure 3:
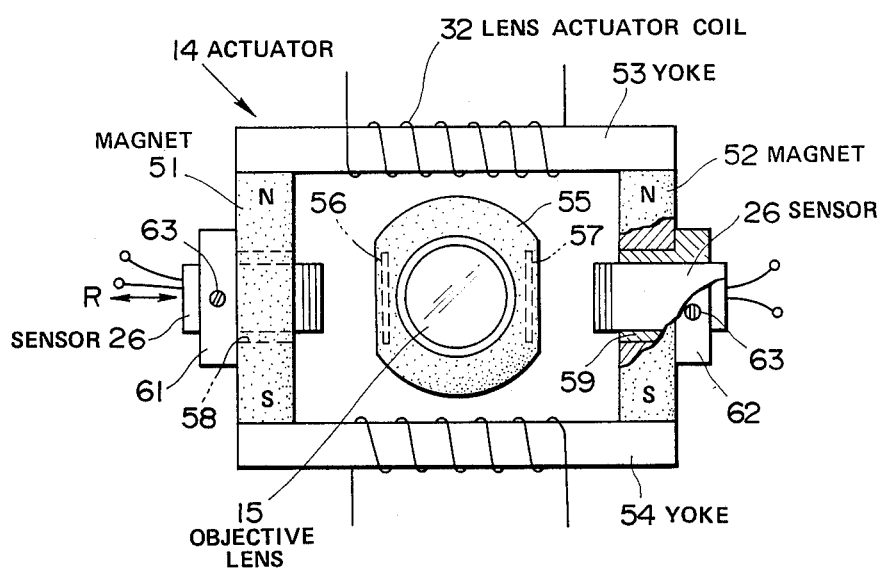

The lens actuator 14 shown in FIG. 3 is provided on both sides of the objective lens 15 with a pair of position sensors 26, 26 as a means of detecting the position with respect to the radial direction R of the disc 2 of the objective lens 15. The outputs of these position sensors 26, 26 are input into a differential amplifier 27 which outputs a signal corresponding to the (positive or negative) varied position from the balanced position. The output of this differential amplifier 27 is input to the adder 25 through an analogue switch 28. The output of the adder 25 is input into a driving circuit 31 through a gain controlling circuit 29 and phase compensating circuit 30. The output of this driving circuit 31 is applied to a lens actuator coil (tracking coil) 32 and can control the fine displacement in the radial direction R of the disc 2 of the objective lens 15. For example, if the lens actuator coil 32 is controlled with a driving signal based on the output of the tracking error signal $T_{ER}$, the radial position of the light beam radiated in the form of a spot onto the disc 2 will be mounted on the nearest track in the part irradiated with the light beam and will always be held in a tracking servo-state scanning the tracks (in case the eccentricity of the disc 2 is small).

On the other hand, when the lens actuator coil 32 is driven by the differential outputs of the position sensors 26, 26, it will function as a lens balancing position servo-means holding the objective lens 15 in a balanced position state.

An outer scale 34 such as a magnetic scale or a potentiometer is provided (See FIG. 2) as a displacement detecting means when moving the optical head 5 itself to be able to detect the displacement of the optical head 5.

For example, making a coarse access close to the objective track from the present track by using the outer scale 34 shall be explained. The output of the photodetector 16 is input into an address decoding circuit 72 through an adder 71. The address decoding circuit 72 decodes the present track address from the ID information contained in the preformat part and delivers it to a controller 73. The controller 73 (a) receives the objective track address, (b) determines the difference between the present track and objective track, (c) converts the value to the number of pitches on the outer scale 34, (d) presets it in a counter 74 and (e) delivers a carriage seeking signal $S_{CS}$ driving the voice coil motor 6 to a driving circuit 39 through an analogue switch 43. On the other hand, the output of the outer scale 34 is input into the counter 74 through a differential amplifier 35 and waveform shaping circuit 75. The counter 74 counts the outer scale signals and, when the difference between the preset value and the counted value is 0, it will deliver a signal for stopping the carriage seeking signal $S_{CS}$ to the controller 73. Therefore, the optical head 5 will be quickly set in a position within one pitch of the outer scale 34.

In case the optical head 5 itself is set close to the predetermined track by the moving carriage seeking, then it will be set in a fine access mode and will be tracked on the objective track. However, in order to have a controlled state in which the voice coil motor 6 is held within one pitch of the outer scale by the outer scale signal, in order to prevent the influence of the eccentricity of the disc 2, first the carriage is switched to be in a servo-state (called also switching from the velocity control to the position controlling state).

That is to say, as shown in FIG. 1, the output of the outer scale signal (Here the signal 34A is of a preset value or 0 value and the signal 34B represents an actual outer scale signal output.) is applied to the other contact 24B of the switching switch 24 through a differential amplifier 35 and gain controlling circuit 36. The signal output from the switching contact 24C of the switching switch 24 is applied to the driving circuit 39 through the phase compensating circuit 37 and analogue switch 38. The output of the driving circuit 39 is applied to a voice coil 41 of the voice coil motor 6 to control the position of the optical head 5.

When the above mentioned carriage seeking is switched over to the carriage servo-state, in FIG. 1, with the carriage seeking signal $S_{CS}$ driving the voice coil motor 6 (through the driving circuit 39) with the outer scale signals 34A and 34B, a carriage seeking mode signal $M_{CS}$ will be set to a low level from a high level, thereby an analogue switch 43 will be turned off, the input to the voice coil 41 will be cut off and the other analogue switch 38 will be turned on through an inverter 42. The switching switch 24 will be connected to the contact 24B side and, on the basis of the outer scale signals 34A and 34B, the optical head 5 will be held close to the predetermined track with no eccentricity of the disc 2 or the like.

The tracking error signal $T_{ER}$ based on the photodetector 16 from just before to just after being switched to the above mentioned carriage servo-state will output a sine waveform signal whenever it crosses one track as shown in FIG. 4(a). By the zero cross comparator 22 forming the monitoring means 21 of the track crossing velocity, as shown in FIG. 4(b), the outputs are converted to pulses of time widths required for the light beam to cross the track. Further, by the timing logic circuit 23, such edge wave output as is shown in FIG. 4(c) is obtained and whether the time $\Delta t$ between the adjacent pulse trains is above such predetermined value as, for example, 0.8 (m.sec.) or not is detected. That is to say, whether the time required for the light beam to cross one track is above 0.8 (m.sec.) or not or whether the track crossing velocity is below a predetermined value or not is detected.

Figure 6:
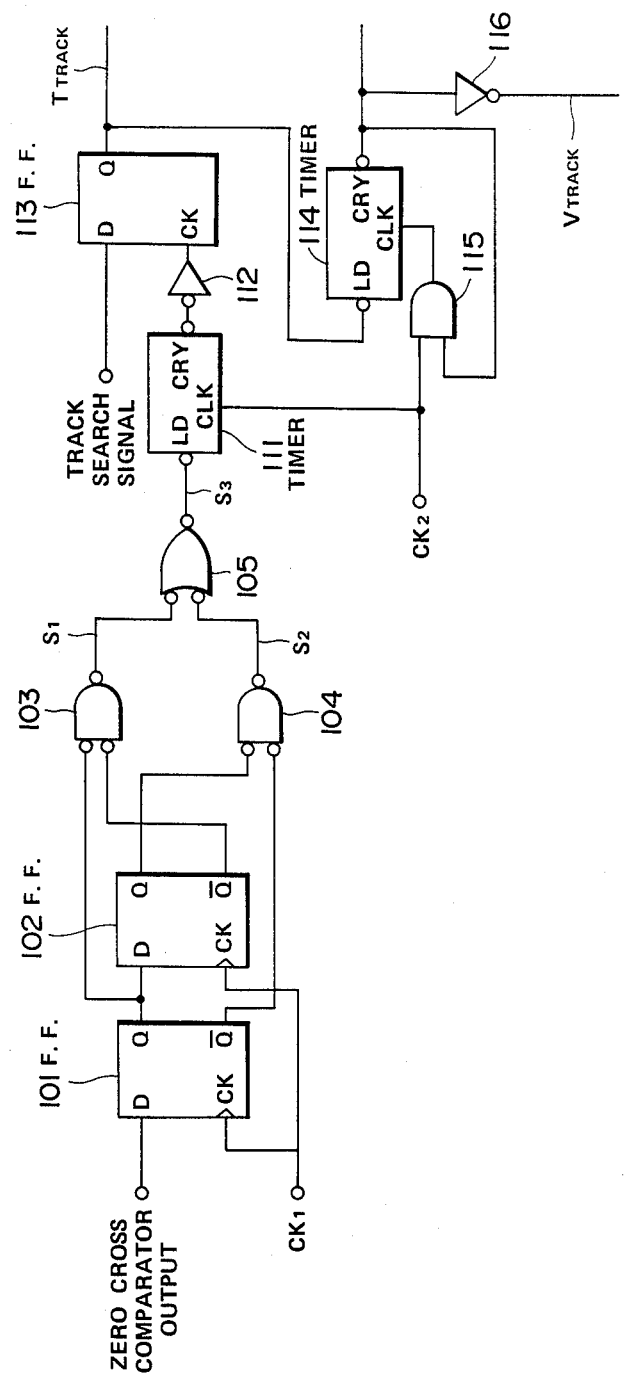
Figure 7:
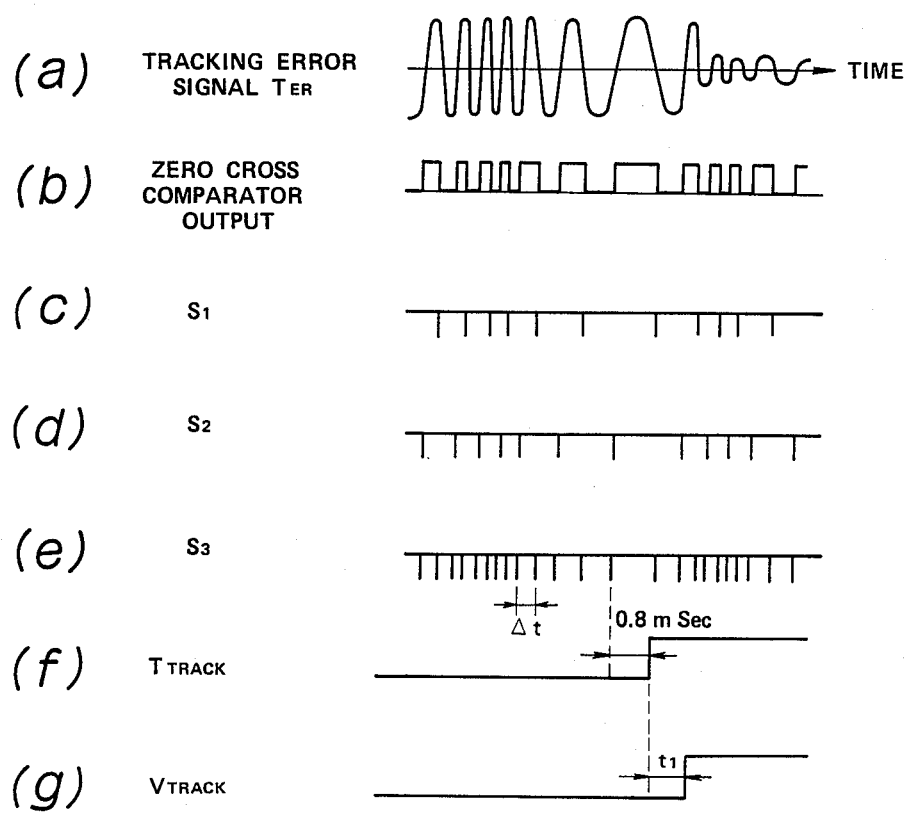

The timing logic circuit 23 is formed, for example, as shown in FIG. 6. The operation of the timing logic circuit 23 shall be explained with reference to FIG. 7. The tracking error signal $T_{ER}$ shown in FIG. 7(a) is input into the zero cross comparator 22. The output of the zero cross comparator 22 shown in FIG. 7(b) is input into the data input end D of a flip-flop (abbreviated as F.F. hereinafter) 101. A clock pulse CK1 has been input into the clock terminal CK of the F.F. 101. The clock pulse CK1 is high enough in frequency when compared with the output of the zero cross comparator 22. The moment the clock pulse CK1 rises, the F.F. 101 will output as an output Q, the value input into the data input end D. The output Q of the F.F. 101 is input into an INVERT-NAND 103 and is also input into the data input end D of the F.F. 102. On the other hand, the output $\overline{Q}$ of the F.F. 101 is input into an INVERT-NAND 104. The clock pulse CK1 has been input into the clock terminal CK of the F.F. 102. The output Q of the F.F. 102 is input into the INVERT-NAND 104 and the output $\overline{Q}$ is input into the INVERT-NAND 103. Therefore, from the INVERT-NAND 103, as shown in FIG. 7(c), a pulse is output by the falling edge of the output of the zero cross comparator 22. On the other hand, from the INVERT-NAND 104, as shown in FIG. 7(d), a pulse is output by the rising edge of the output of the zero cross comparator 22. The output $S_1$ of this INVERT-NAND 103 and output $S_2$ of the INVERT-NAND 104 are input into an INVERT-NOR 105. From the INVERT-NOR 105, as shown in FIG. 7(e), the pulse of the time interval $\Delta t$ required for the light beam to cross the track is output. The output $S_3$ of the INVERT-NOR 105 is input into the load terminal of a timer 111. A clock pulse CK2 is input into the clock terminal CLK of the timer 111. The timer 111 counts the clock pulse CK2. The count is reset by the output $S_3$ of the INVERT-NOR 105 input into the load terminal LD. When the timer 111 counts a predetermined number of the clock pulse CK2, it will output a reversed CARRY output CRY. Therefore, when the time $\Delta t$ between the adjacent pulse trains of the output $S_3$ is above a predetermined value, for example, 0.8 (m.sec.), the output CRY will reverse. This output CRY is input into the clock terminal CK of the F.F. 113 through an invertor 112. When the seeking ends, a track searching signal TRK SRH will be input into the data input end D of the F.F. 113. When the output CRY of the timer 111 reverses, the output Q of the F.F. 113 will be turned on and will output the on-track controlling signal $T_{TRACK}$ as is shown in FIG. 7(f). The output Q of the F.F. 113 is input into the load terminal LD of the timer 114. The clock pulse CK2 is put into the clock terminal CLK of the timer 114 through an AND 115. The output CRY of the timer 114 has been input into the AND 115. By the same operation as timer 111, the timer 114 outputs a reversed CARRY output CRY as delayed by a predetermined time $t_1$ from the on-track controlling signal $T_{TRACK}$. The output CRY is input into an inverter 46 as a damping controlling signal and is output as a switching signal $V_{TRACK}$ as is shown in FIG. 7(g) through an inverter 116. Thus, due to the track crossing velocity monitoring means 21, as shwon in FIG. 4(d), when the carriage servo-state is on and then the crossing velocity is below the predetermined value, an on-track controlling signal $T_{TRACK}$ will be output to switch the analogue switch 19 on as shown in FIG. 4(e) from the timing logic circuit 23. The tracking error signal $T_{ER}$ will be passed through the adder 25 and will be applied to the lens actuator coil 32 through the driving circuit 31. The objective lens 15 will be finely moved and the light beam will be tracked on the nearest track. At the same time, the analogue switch 28 which is set on, will be turned off through the invertor 44 after the coarse access in order to prevent the objective lens 15, using the output of the position sensors 26, 26, from being vibrated by the acceleration when the optical head 5 is moved or stopped. In case the track crossing velocity is below the predetermined value, when an on-track pull-in is made, the acceleration acting relatively on the objective lens 15 at the time of the carriage servo-operation of the optical head 5 will be small enough. Therefore, if the on-track pull-in is made at this timing, the objective lens 15 will not be substantially vibrated or will have the vibration controlled to be near to the minimum and the on-tracking pull-in will start.

These timings are shown in FIG. 5. FIG. 5(a) shows a carriage seeking mode signal $M_{CS}$. When going from off to on, if no measures are taken, the objective lens 15 in the seeking mode will vibrate as shown in FIG. 5(c). Therefore, the timing logic circuit 23 will set the analogue switch 28 on. As described above, on the basis of the outputs of the position sensors 26, 26, the objective lens 15 is held in a balanced position. (This state is shown by the lens balancing position servo-means in FIG. 5(d).) If an acceleration is produced when the optical head 5 is moved or stopped, the objective lens 15 will be likely to vibrate also in the direction vertical to the disc surface. Therefore, in order to more positively prevent the objective lens 15 from vibrating in the radial direction in case the acceleration of the optical head 5 is produced, as shown in FIG. 1, the output of the driving circuit 39 driving the voice coil 41 is applied as a lens damping signal $S_{LD}$ also on the driving circuit 31 on the lens actuator coil 32 side through an analogue switch 45 to form a lens damping means damping the lens so that no acceleration may act to vibrate the objective lens 15 in case the optical head 5 is moved or stopped. The analogue switch 45 is controlled to be on or off by a damping controlling signal through the inverter 46 from the timing logic circuit 23. The lens damping signal $S_{LD}$ will be on when the carriage seeking is on as shown in FIG. 5(e).

When, as shown in FIGS. 5(a) and 5(b), the carriage seeking shifts to the carriage servo-state and the output of the track crossing velocity monitoring means 21 becomes below a predetermined value, by the on-track controlling signal $T_{TRACK}$, the analogue switch 28 will be turned off, the lens balancing servo-means will be turned off, the analogue switch 19 will be turned on and, by the track error signal $T_{ER}$, the light beam will begin to be pulled in to be on the track and will be soon on the track. Thus, as shown in FIG. 5 (f), the on-track controlling signal $T_{TRACK}$ will be on somewhat later than the time when the carriage seeking ends.

At a fixed time $t_1$ after the on-track controlling signal $T_{TRACK}$ is set on, the timing logic circuit 23 will output a switching signal $V_{TRACK}$ such as is shown in FIG. 5(g) to the switching switch 24 to switch the switching switch 24 to the contact 24A side from the contact 24B side, to begin the signal $V_{TRACK}$, to switch off the analogue switch 45 and to release the lens damping. Even if the signal $T_{TRACK}$ is on, the lens damping will not be released at once, because a more stable servo-pull-in is intended. Needless to say, as soon as the signal $T_{TRACK}$ is on, the lens damping signal may be released.

When the switching signal 24 is switched to the contact 24A side, the carriage servo-state will end and, on the basis of the tracking error signal $T_{ER}$, the device of the voice coil 41 will be controlled and the lens actuator coil 32 will be in the tracking servo-state by the tracking error signal $T_{ER}$ with the lens damping released.

In case the disc 2 is being rotated eccentrically, while the eccentricity is absorbed with the voice coil motor 6 by driving the voice coil 41 on the basis of the tracking error signal $T_{ER}$, the objective lens 15 will be driven by the lens actuator coil 32 so as to make a two-step servo-state holding the light beam on the track.

When the lens damping is released by the timing of pulling in the tracking state in the two-step servo-system, as shown in FIG. 5(h), the vibration of the objective lens 15 will be able to be greatly reduced.

The lens actuator 14 and position sensors 26, 26 are of structures such as are shown in FIG. 3.

Bar-shaped permanent magnets 51 and 52 magnetically showing the same characteristics are set as balanced and opposed to each other with the magnetizing directions in the same direction. Yokes 53 and 54 are parallelly arranged so as to short-circuit the respective magnetic poles of the same polarity in the direction intersecting at right angles with the pair of permanent magnets 51 and 52 to form a four-sided closed magnetic circuit with the permanent magnets 51 and 52 and yokes 53 and 54 as four sides. A lens actuator coil 32 is shunt-wound on each of the yokes 53 and 54.

In the center of the space inside the closed magnetic circuit, a movable member 55 formed to be substantially ring-shaped of a magnetic material of a high permeability is fitted to the end parts (upper end parts) of parallel plate springs 56 and 57 erected in the direction vertical to the paper surface so as to be movable in the direction vertical to the plate surface indicated by the symbol R in FIG. 2 by a force against the energizing forces of these plate springs 56 and 57. The objective lens 15 is fitted through a frame inside the movable member 55.

The outer peripheral parts opposed to the respective permanent magnets 51 and 52 of the movable member 55 are somewhat cut off so as to be parallel with the opposed inside surfaces of the permanent magnets 51 and 52 to make the position detection easy. Through holes 58 and 59 are formed respectively in the middles of the lengthwise directions of both permanent magnets 51 and 52 as opposed to the cut surfaces. Position sensors 26, 26 are fitted respectively in the through holes 58 and 59 through spacers 61 and 62.

The respective position sensor 26 fitting positions can be finely adjusted in the radial direction and can be fixed by screws 63.

Any position sensor whose output level varies with the distance variation near the distance to the balancing position can be used for the position sensor 26. Various known position sensors can be used. For example, position sensors such as magneto-electric conversion type uses a hole element or is an eddy current detecting type and of an electrostatic capacity system can be used.

After the tracking servo-state of the two-step servo-system is set, as known, the present track position will be detected, a kick signal corresponding to the difference from the objective track will be applied to the lens actuator coil 32 and a fine access will be made to track on the objective track.

As described above, according to this embodiment, a track crossing velocity monitoring means is provided so that, after a coarse access is made close to the objective track by the coarse access means, the lens clamping applied to the objective lens will be released by the output of the monitoring means to set a tracking state. Therefore, the vibration produced in the objective lens can be made small enough and an access to the objective track can be made at a high speed.

It is apparent that the present invention is not limited to the formation of using the voice coil motor 6 as a coarsely moving means.

In the above mentioned embodiment, in case the track crossing velocity is below a predetermined value by the track crossing velocity monitoring means 21, in the lens balancing position servo-means and the lens damping means, first the lens balancing position servo-means will be released and then the lens damping will be released. However, the present invention is not limited to this but includes, for example, the case of releasing the lens damping means simultaneously with the lens balancing position servo-means. In such a case, the switching switch 24 may be switched somewhat later.

Also, the optical means of converging and radiating a light beam onto the optical recording medium is not limited to the objective lens but may be a mirror or the like.

The present invention can be extensively applied to photodiscs, photomagnetic discs and compact discs (devices) wherein optical recording media are rotated and driven.

It is apparent that, in this invention, working modes different in a wide range can be formed on the basis of this invention without departing from the spirit and scope of the invention. This invention is not restricted by its specific working modes except being limited by the appended claims.

We claim:

1. An optical information recording and/or reproducing apparatus comprising:
    an optical head including
        an optical means of converging and radiating a light beam onto an optical information recording medium,
        a finely moving means, said finely moving means controlling a movement of the optical means in a direction intersecting tracks of the recording medium so that a position of a spot light radiated onto the recording is made finely movable, and
        an optical system leading the light beam from a light source generating light beams to the optical means and leading the light returning from the recording medium to a photodetector;
    a coarsely moving means making the optical head movable in the direction intersecting the tracks of the recording medium;
    starting means for starting a coarse access;
    control means responsive to the starting means and a sensing means, said control means for controlling the coarsely moving means;
    said sensing means for sensing until the optical head is located close to a desired track;
    a clamping means for clamping said optical means when the coarse access of the optical head is made close to an objective track by the coarsely moving means, the clamping means clamping the optical means until a clamping releasing signal is input thereto from a track crossing velocity monitoring means, the clamping of the optical means the being released; and
    said track crossing velocity monitoring means for detecting whether or not the track crossing velocity, at which the spot light radiated on to the recording medium crosses the tracks of the recording medium, is below a predetermined value so that, when the track crossing velocity is below the predetermined the coarsely moving means, the optical means clamping releasing signal will be output to the clamping means.

2. An optical information recording and/or reproducing apparatus according to claim 1 wherein the clamping means comprises an optical means balancing position servo-means holding the optical means in a balanced position and an optical means damping means wherein a part of a signal applied to the coarsely moving means is applied to the finely moving means to prevent the generation of the vibration of the optical means in case an acceleration acts on the optical head.

3. An optical information recording and/or reproducing apparatus according to claim 2 wherein the track crossing velocity monitoring means puts out a servo-means releasing signal to the optical means balancing position servo-means in case the track crossing velocity is below the predetermined value and then outputs a damping releasing signal to the optical means damping means.

4. An optical information recording and/or reproducing apparatus according to claim 2 wherein the optical means balancing position servo-means is controlled by the output of a position detecting means detecting the position of the optical means.

5. An optical information recording and/or reproducing apparatus according to claim 1 wherein the optical means is an objective lens.

6. An optical information recording and/or reproducing apparatus according to claim 1 wherein the finely moving means comprises a movable member made of a magnetic material holding the optical means and an actuator coil controlling the displacement of the movable member with the output of a tracking error detecting means outputting a tracking error signal corresponding to the shift in case the light beam shifts from the tracking state.

7. An optical information recording and/or reproducing apparatus according to claim 1 wherein the coarsely moving means is a voice coil motor.

8. An optical information recording and/or reproducing apparatus according to claim 1 wherein the coarsely moving means is responsive to the output of an optical head displacement detecting means during a coarse access.

9. An optical information recording and/or reproducing apparatus according to claim 1 wherein the track crossing velocity monitoring means is provided with a zero cross comparator converting a tracking error signal to a pulse of a time width required for a light beam to cross a track and a timing logic circuit detecting from the output of the zero cross comparator whether the time required for the light beam to cross the track is above a predetermined value or whether the velocity at which the light beam crosses the track is below a predetermined value.

10. An optical information recording and/or reproducing apparatus according to claim 9 wherein the timing logic circuit is provided with an edge detecting means including two flip-flops outputting pulses with the rising edge and falling edge of the output of the zero cross comparator and a pulse interval detecting means including a timer detecting whether the time between the adjacent pulse trains of the output of the edge detecting means is above a predetermined value or not.

* * * * *